United States Patent

Edwards

[15] 3,690,194
[45] Sept. 12, 1972

[54] WORK DRIVE MECHANISM

[72] Inventor: Ralph W. Edwards, Bellbrook, Ohio
[73] Assignee: General Motors Corporation, Detroit, Mich.
[22] Filed: May 14, 1971
[21] Appl. No.: 143,534

[52] U.S. Cl. .................................74/427, 74/409
[51] Int. Cl. .........................F16h 1/16, F16h 55/18
[58] Field of Search..................74/427, 421 A, 409

[56] References Cited

UNITED STATES PATENTS 2,582,690   1/1952   Franz...........................74/427
2,877,658   3/1957   Anthony.................74/427 X Primary Examiner—Leonard H. Gerin
Attorney—W. E. Finken and W. A. Schuetz

[57] ABSTRACT

In a preferred form, this disclosure relates to a worm drive mechanism which includes an electric motor which is carried by a housing and has a rotatable drive shaft with an end portion supported in a cantilever fashion and carrying a worm intermediate its ends. The worm drive mechanism also includes a worm wheel which is in meshed engagement with the worm and is fixedly supported upon a rotatably mounted output shaft. The worm drive mechanism further includes a stabilizer wedge which substantially prevents deflection of the drive shaft away from the worm wheel by engaging the cantilever supported end portion of the drive shaft with a tapered surface. The stabilizer wedge is slidably supported for movement toward and from the drive shaft to allow the tapered surface to engage the end portion at a location diametrically opposite its engagement with the worm wheel, and a spring means biases the stabilizer wedge toward the drive shaft to maintain the tapered surface in engagement with the drive shaft.

3 Claims, 3 Drawing Figures

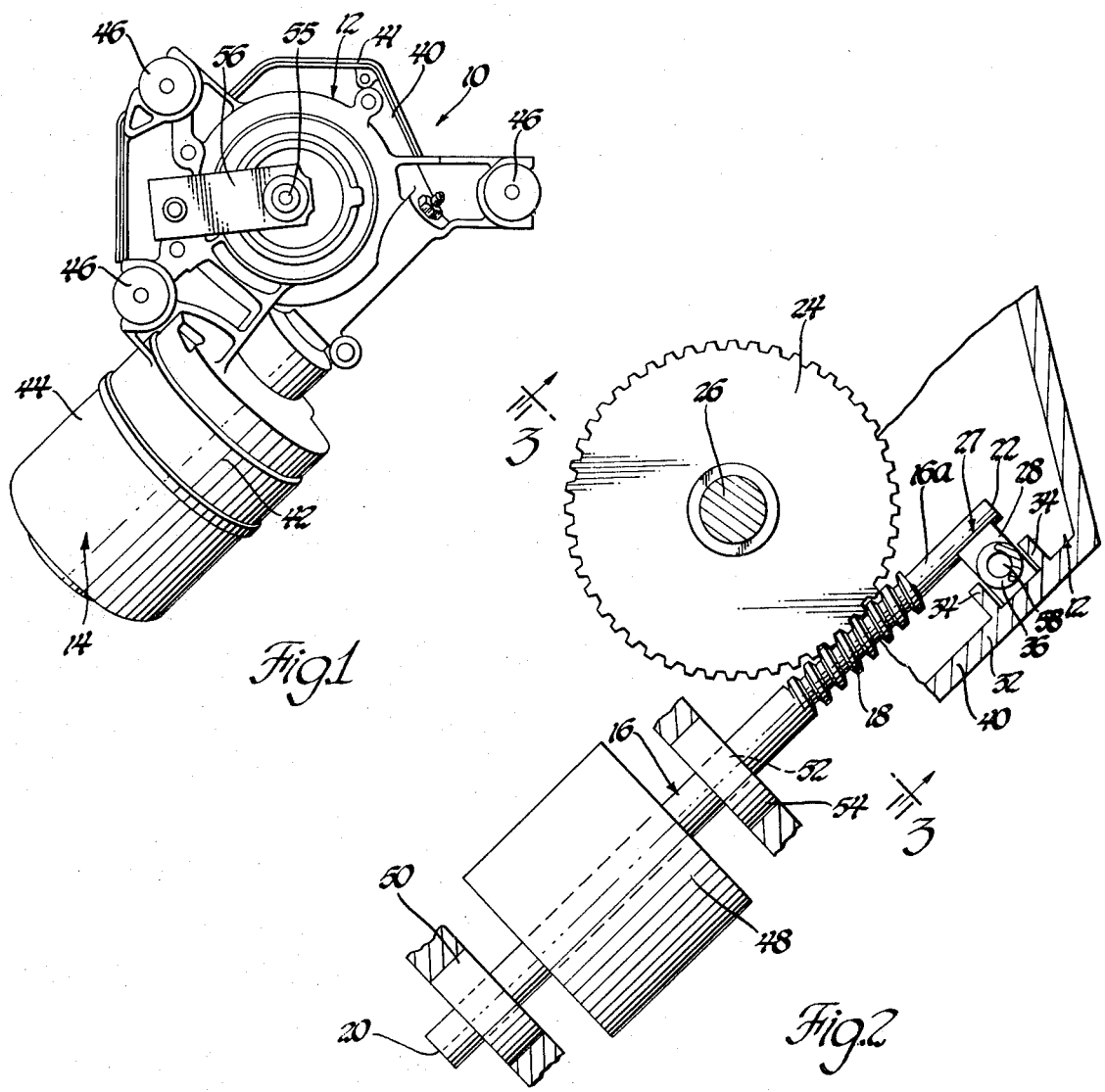

WORK DRIVE MECHANISM

The present invention relates to a worm drive mechanism, and more particularly to a worm drive mechanism for driving a windshield wiper linkage of a windshield wiper system of an automotive vehicle.

Worm drive mechanisms comprising a drive shaft having a worm in meshed engagement with a worm wheel have been commonly employed in many devices, including vehicle windshield wiping systems, as shown in U.S. Pat. No. 3,253,206. When a worm drive mechanism has been utilized in which one end of the drive shaft has been supported in a cantilever fashion and the mechanism is placed under a heavy working load, deflection of the drive shaft from the worm wheel can occur. Deflection of the drive shaft from the worm wheel, if sufficient, can result in a loss of gear tooth engagement between the worm and worm wheel which will cause a loss in gear efficiency and possible gear tooth failure and breakage. Deflection of the drive shaft from the worm wheel has heretofore been substantially prevented by engaging the cantilever supported end portion of the drive shaft with various means, such as leaf springs, as shown in U.S. Pat. Nos. 2,106,088 and 2,321,317, fixed bearings, as shown in U.S. Pat. No. 897,916, and spring biased bearings, as shown in U.S. Pat. No. 2,348,391. Further, in mass production where the worm drive mechanism is assembled within a housing, the stacking up of tolerances, which occurs as a result of the assembly of a plurality of interconnected and interdependent component parts in the housing, can result in failure or difficulty in positioning such support means for proper engagement with the drive shaft to prevent the deflection of the drive shaft from the worm wheel.

An object of the present invention is to provide a new and improved worm drive mechanism which includes a housing means, an electric motor carried by the housing means and which has a rotatable drive shaft having an end portion supported in cantilever fashion and carrying a worm intermediate its ends, a worm wheel in meshed engagement with the worm and fixedly supported on an output shaft which is rotatably supported by the housing, a stabilizer wedge which has a tapered surface for engaging the cantilever supported end portion of the drive shaft to substantially prevent deflection of the drive shaft away from the worm wheel, means on the housing for slidably supporting the stabilizer wedge for movement toward and from the drive shaft to allow the tapered surface to engage the end portion at a location diametrically opposite the engagement of the worm wheel with the drive shaft and spring means for biasing the stabilizer wedge toward the drive shaft to maintain the tapered surface in engagement with the drive shaft.

Another object of the present invention is to provide a new and improved worm drive mechanism, as defined in the preceding object, and in which the stabilizer wedge is made from a material having a low coefficient of friction, such as graphite.

Another object of the present invention is to provide a new and improved worm drive mechanism, as defined in the preceding objects, and in which the stabilizer wedge is slidably supported upon a wall of the housing means and guided for movement toward and from the drive shaft by a pair of parallel ribs integral with the housing means.

Briefly these and other objects of the present invention are accomplished, in the preferred embodiment, by providing a worm drive mechanism having a novel stabilizer to substantially prevent deflection of the drive shaft from the worm wheel and in which the stabilizer will always engage the drive shaft irrespective of the tolerance variations in the position of the drive shaft relative to the housing. The worm drive mechanism includes an electric motor carried by a housing and which supports an end portion of a rotatable drive shaft in cantilever fashion. The drive shaft has a worm intermediate its ends which is in meshed engagement with a worm wheel. The worm wheel is fixedly supported upon an output shaft which in turn is rotatably supported by the housing. The worm drive mechanism also includes a stabilizer wedge which has a tapered surface to engage the cantilever supported end portion of the drive shaft to substantially prevent deflection of the drive shaft away from the worm wheel. The stabilizer wedge is slidably supported by a wall of the housing and is guided for movement toward and from the drive shaft by a pair of parallel ribs which are integral with the housing to thus allow the tapered surface to transversely engage the unsupported end at a location diametrically opposite the engagement of the worm wheel with the drive shaft. The worm drive mechanism further includes a spring which abuts another wall of the housing and biases the stabilizer wedge toward the drive shaft to maintain the tapered surface in engagement with the drive shaft.

These and other objects of the invention will become more fully apparent from the following description and drawings wherein:

FIG. 1 is a front elevational view of the drive mechanism of the present invention;

FIG. 2 is an enlarged fragmentary sectional view of part of the drive mechanism of the present invention; and FIG. 3 is a sectional view taken along line 3—3 of FIG. 2.

As representing a preferred embodiment of the present invention, the drawings show a worm drive mechanism 10. Although the worm drive mechanism 10 could be used for driving various mechanisms, it is particularly susceptible for use in a vehicle windshield wiper system (not shown) to drive a linkage to oscillate a pair of windshield wipers.

The worm drive mechanism 10 broadly comprises a housing means 12; an electric motor 14 carried by the housing means and including a rotatable drive or output shaft 16 having an end portion 16a supported in cantilever fashion; a worm 18 carried by the end portion 16a intermediate the ends 20 and 22 of the drive shaft 16; a worm wheel 24 in meshed engagement with the worm 18 and fixedly supported upon an output shaft 26 which is rotatably supported by the housing means 12; and a stabilizer means 27 which engages the end portion 16a of the drive shaft 16 to substantially prevent deflection of the drive shaft 16 away from the worm wheel 24. The stabilizer means 27 includes a stabilizer wedge or member 28 slidably guided for movement by a pair of parallel ribs 34 integral with the housing means 12 for movement toward and from the drive shaft 16 to allow a tapered surface 30 thereon to engage the end portion adjacent its free end 22 at a location diametrically opposite and engagement of the worm wheel 24 with the drive shaft 16 and a spring 36 for biasing the stabilizer wedge 28 toward the drive shaft 16 to maintain the tapered surface 30 in engagement with the end portion 16a of the drive shaft 16.

Referring to FIG. 1, the housing means 12 comprises a casting 40 and a cover plate 41 suitably mounted thereon. The casting 40 and cover plate 41 enclose all portions of the worm drive mechanism 10 with the exception of the electric motor 14 which is partially received within the lower portion 42 of the casting 40 and which has its own end housing 44 which suitably attaches to the lower portion 42 of the casting 40 to fully enclose the electric motor 14. The casting 40 further includes three mountings 46 to enable the worm drive mechanism 10 to be bolted in any suitable or conventional manner to the fire wall (not shown) of a vehicle.

The electric motor 14 can be of any suitable or conventional construction and includes an armature 48 for rotating the drive shaft 16. Referring to FIG. 2, the drive shaft 16 has an end portion 16a which extends from the armature through the lower portion 42 of the casting 40 and is supported in a cantilever fashion. The drive shaft 16 has one end 20 on one side of the armature 48 rotatably supported within a first bearing 50 and its midportion 52 on the other side of the armature 48 rotatably supported by a second bearing 54. The drive shaft portion 16a adjacent its free end 22 is machined to a smaller diameter than the diameter of the remainder of the drive shaft 16. Intermediate the ends of the drive shaft portion 16a of the drive shaft 16 is the worm 18 which is integral therewith.

A worm wheel 24 is in meshed engagement with the worm 18 and is fixedly supported in any suitable manner upon an output shaft 26 which in turn is rotatably supported by the housing means 12 in a conventional manner. The output shaft 26 extends outwardly through an opening (not shown) of the casting 40 of the housing means 12 and has fixedly attached to its outer end 55 one end of a crank arm 56. The other end of the crank arm 56 is adapted to be connected with a linkage means (not shown) of the windshield wiper system. Rotation of the worm wheel 24 and the output shaft 26 in response to rotation of the worm 18 serves to rotate the crank arm 56 to impart a reciprocating movement to the windshield wiper linkage means (not shown).

The stabilizer wedge 28 can be made from any suitable material having a relatively low coefficient of friction, such as graphite material, and has a tapered side surface 30 which engages the free end 22 of the drive shaft portion 16a to substantially prevent deflection of the drive shaft 16 away from the worm wheel 24 when the worm drive mechanism 10 is under heavy loads. The stabilizer wedge 28 is in the general shape of a trapezoid, as viewed in side elevation in FIG. 3, and has a cylindrical end projection 58 extending from one end 60. The stabilizer wedge 28 has a rectangular cross-section and a width, as viewed in FIG. 3, which progressively decreases proceeding from its upper end toward its lower end to define the tapered side surface 30. The stabilizer wedge 28 is slidably supported on its underside 62 which is opposite the tapered surface 30 by a wall 32 of the casting 40.

The worm drive mechanism 10 also includes a pair of parallel ribs 34 integral with the wall 32 of the casting 40 for guiding the stabilizer wedge 28 for movement toward and from the drive shaft portion 16a. The stabilizer wedge 28 is positioned between the ribs 34 and has its underside 62 supported by that portion of the wall 32 between the ribs 34. The wall 32 and the ribs 34 form a guide channel which extends in a direction perpendicular to the axis of rotation of the drive shaft 16. The stabilizer wedge 28 is positioned between the ribs 34 in a manner such that its tapered side surface 30 engages the drive shaft portion 16a adjacent its free end 22. In this manner, movement of the stabilizer wedge 28 is restricted to movement toward and from the drive shaft portion 16a.

The stabilizer wedge 28 is biased toward the drive shaft 16 and the tapered surface 30 is maintained in engagement with the drive shaft portion 16a by a conventional coil compression spring 36. The spring 36 has one end in an abutting engagement with the cover 41 and has its other end in abutting engagement with the stabilizer wedge 28 at its upper end 60. Further, the end of the spring 36 abutting the upper end 60 of the stabilizer wedge 28 has the cylindrical projection 58 received in a concentric relationship therein to assure proper application of pressure by the spring 36 upon the central portion of the stabilizer wedge 28.

The provision of the tapered side surface 30 of the stabilizer wedge 28 assures that the stabilizer wedge 28 will engage the drive shaft portion 16a adjacent its free end 22 irrespective of the tolerance variations in the output shaft 26, worm wheel 24, the electric motor 14 and the housing means 12.

In operation, rotation of the drive shaft 16 by the electric motor 14 rotates the worm wheel 24 through the worm 18. The rotation of the worm wheel 24 rotates the output shaft 26 and crank arm 56 to reciprocate a windshield wiper linkage means (not shown). Under heavy load conditions the resultant forces between the gear teeth of the worm wheel 24 and the teeth of the worm 18 tends to move or deflect the drive shaft 16 away from the worm wheel 24. The deflection, however, it prevented or substantially prevented by the stabilizer wedge 28 whose tapered side surface 30 engages the drive shaft portion 16a. This engagement is maintained by the bias of spring 36. The spring 36 also serves to move the wedge 28 downwardly over a period of time to compensate for wear on the wedge 28.

The foregoing disclosure relates to only one embodiment of the invention which may be modified within the scope of the appended claims.

What is claimed is:

1. A drive mechanism comprising: housing means; an electric motor carried by said housing means and including a rotatable drive shaft; said drive shaft having an end portion supported in a cantilever fashion and a worm intermediate its ends; a worm wheel in meshed engagement with said worm and fixedly supported on an output shaft rotatably supported by said housing means; a stabilizer wedge having a tapered surface engaging the drive shaft portion adjacent its free end to substantially prevent deflection of said drive shaft portion away from said worm wheel; means on said housing for slidably supporting said stabilizer wedge for movement toward and from said drive shaft to allow said tapered surface to engage said drive shaft portion at a location diametrically opposite the engagement of said worm wheel with said drive shaft; and spring means biasing said stabilizer wedge into engagement with said drive shaft.

2. A worm drive mechanism comprising; housing means; an electric motor carried by said housing means and having a rotatable drive shaft; said drive shaft having an end portion supported in cantilever fashion and having a worm intermediate its ends; a worm wheel in meshed engagement with said worm and fixedly supported on an output shaft rotatably supported by said housing means; a stabilizer wedge having a tapered surface engaging the drive shaft portion adjacent its free end to substantially prevent deflection of said drive shaft away from said worm wheel, said stabilizer wedge being slidably supported by a wall of said housing means; a pair of parallel ribs integral with said housing means for guiding said stabilizer wedge for movement toward and from said drive shaft to allow said tapered surface to transversely engage said drive shaft portion at a location diametrically opposite the engagement of said worm wheel with said drive shaft; and a spring biasing said stabilizer wedge toward said drive shaft to maintain said tapered surface in engagement with said drive shaft.

3. A worm drive mechanism for a vehicle windshield wiper unit, comprising: a housing; an electric motor carried by said housing and having a drive shaft connected to the armature of said electric motor for rotation therewith, said drive shaft having an end portion supported in cantilever fashion; said drive shaft adjacent one end on one side of said armature being rotatably supported by a first bearing and adjacent its midpoint on the other side of said armature being rotatably supported by a second bearing, said end portion of stabilizer wedge for movement toward and from said drive shaft shaft having a worm intermediate its ends, a worm wheel in meshed engagement with said worm and fixedly supported on an output shaft rotatably supported by said housing for driving a windshield wiper linkage means; a stabilizer wedge of material having a low coefficient of friction and having a tapered surface engaging said end portion of said drive shaft to substantially prevent deflection of said drive shaft away from said worm wheel, said stabilizer wedge being slidably supported by a wall of said housing means; a pair of parallel ribs integral with said housing means for guiding said drive shaft and for positioning said stabilizer wedge with said tapered surface extending perpendicularly to the axis of said drive shaft to allow said tapered surface to engage said drive shaft portion at a location diametrically opposite the engagement of said worm wheel with said drive shaft; and a spring abutting another portion of said housing means and biasing said stabilizer wedge toward said drive shaft to maintain said tapered surface in engagement with said drive shaft.

* * * * *